United States Patent [19]

Box, Jr. et al.

[11] 3,992,295

[45] Nov. 16, 1976

[54] POLLUTED WATER PURIFICATION

[75] Inventors: E. O. Box, Jr.; Floyd Farha, Jr., both of Bartlesville, Okla.

[73] Assignee: Phillips Petroleum Company, Bartlesville, Okla.

[22] Filed: Feb. 24, 1975

[21] Appl. No.: 552,605

[52] U.S. Cl. .............................................. 210/63 R
[51] Int. Cl.² ............................................ C02B 1/34
[58] Field of Search ............... 252/471; 210/63, 50, 210/59, 64

[56] References Cited
UNITED STATES PATENTS

| | | | |
|---|---|---|---|
| 3,365,337 | 1/1968 | Hoffman | 252/471 |
| 3,442,802 | 5/1969 | Hamilton et al. | 210/63 |
| 3,663,457 | 5/1972 | Tamura et al. | 252/471 |
| 3,804,756 | 4/1974 | Callahan et al. | 210/63 |
| 3,823,088 | 7/1974 | Box et al. | 210/63 |
| 3,839,545 | 10/1974 | Schwab | 252/471 |

FOREIGN PATENTS OR APPLICATIONS

| | | | |
|---|---|---|---|
| 2,057,633 | 5/1971 | France | 252/471 |
| 326,977 | 3/1972 | U.S.S.R. | 252/471 |

*Primary Examiner*—Charles N. Hart
*Assistant Examiner*—Benoit Castel

[57] ABSTRACT

Organically polluted waters are purified by contacting with a solid copper-manganese-oxygen catalyst under oxidizing conditions. In one embodiment, an aqueous stream obtained from the effluent of an oxidative dehydrogenation process containing contaminating oxygen-containing organic materials is subjected to oxidizing conditions in the presence of copper manganites to convert the water to a potable aqueous product.

6 Claims, No Drawings

POLLUTED WATER PURIFICATION

This invention relates to the purification of organically polluted waters. In accordance with another aspect, this invention relates to a process for converting organic contaminated aqueous streams to fresh potable water by oxidation in the presence of a solid copper-manganese-oxygen catalyst. In accordance with another aspect, this invention relates to a continuous process for the abatement of water pollution by removing oxidizable organic wastes from aqueous streams by oxidizing these compounds preferably in the liquid phase in the presence of a solid copper-manganese-oxygen catalyst.

The problem of disposing of waste-containing waters has, in recent years, become more acute due to increasing population and increasing industrial activity. This is particularly true of waters which are polluted by the presence of organic materials such as waters discharged in a chemical process. Frequently, such waste waters contain organic materials in concentrations far too low for them to be conveniently or economically recoverable, yet in concentrations so high that it is impractical and undesirable to simply pump the waste water into available streams, rivers, lakes, or ponds.

Some processes are known in which such organic-containing waste waters can be subjected to air oxidation under elevated temperatures. Such air oxidation converts most or all of the organic matter into harmless materials such as carbon dioxide or water vapor. This reaction is sometimes carried out in the presence of catalysts to promote the oxidation and to allow the reaction to be carried out under less severe conditions.

Although a number of catalysts and catalytic processes are known to carry out such air oxidation, not all catalysts which have activity for promoting oxidation have been found to be suitable. The conditions under which small amounts of organic wastes are oxidized in the presence of large amounts of water are relatively severe. The present invention provides an alternative catalyst and process to achieve this purpose. The outstanding feature of the invention is the activity and durability of the catalyst system.

Accordingly, an object of this invention is to provide an improved process for the purification of organically polluted water.

Another object of this invention is to provide a process for the purification of water streams containing oxygen-containing compounds.

Other objects and aspects, as well as the several advantages of the invention, will be apparent to those skilled in the art upon reading the specification and the appended claims.

In accordance with the invention, a process is provided for converting water contaminated with organic materials to a potable aqueous product by contacting contaminated aqueous streams under oxidation conditions with a solid copper-manganese-oxygen catalyst.

More specifically, in accordance with the invention, a process is provided for continuously converting organic contaminated aqueous streams to fresh potable water by contacting in the liquid phase an aqueous stream so contaminated with a solid copper-manganese-oxygen catalyst under conditions so as to produce water essentially free of pollutants.

The pollutants, for example, are dissolved and suspended olefins, paraffins, aromatics, naphthenes, and oxygenated organic compounds including acids, alcohols, aldehydes, ethers, ketones, and the like contained in waste water produced from various chemical and biological sources.

The solid catalysts utilized in the process of this invention consist of copper, manganese, and oxygen in which the atomic ratio of copper to manganese can vary from about 0.25:1 to about 4:1. Particularly useful compositions have empirical formulas such as $Cu_3Mn_2O_6$, $Cu_2Mn_2O_5$, $CuMnO_2$, $CuMn_2O_3$, $CuMn_3O_4$, and $CuMn_2O_4$, and mixtures thereof. The catalysts are prepared by employing conventional techniques including intimate mixing of the oxides or hydroxides by ball milling, grinding, and the like, and by coprecipitation of the oxalates or hydroxides from a solution containing dissolved salts of the metals. The precipitate is washed to remove soluble contaminants such as, for example, potassium nitrate, sodium chloride, sodium sulfate, and the like. The purified material is then dried and calcined in air for about 30 minutes to 20 hours or longer at temperatures ranging from about 500° to 1600° F (260°–871° C), more preferably from about 900°–1100° F (482°–593° C).

Small amounts of such metals as iron, magnesium, silicon, and calcium can be present in the finished catalyst, as well as lesser amounts of chromium, aluminum, and nickel in the form of oxides, silicates, etc., providing the total amount of such metals does not exceed about five weight percent. Generally, the amounts of aluminum and nickel will be no more than about 0.01 weight percent each, chromium will be no more than about 0.1 weight percent, and the remainder will be no more than about 1 weight percent each.

U.S. Pat. No. 3,365,337 describes the formation of copper manganites by coprecipitation of an aqueous solution of copper sulfate and manganese sulfate with a solution of sodium hydroxide. The resulting mixed hydroxides are washed, and the purified mixture is then calcined in air at about 1100° F (593° C). The calcined product had an empirical formula of $CuMn_2O_4$.

Metal oxides that can be used in forming the catalysts include cupric oxide, cuprous oxide, manganous oxide, manganic oxide, manganous manganic oxide ($Mn_3O_4$), and manganese dioxide. Metal salts of copper and manganese that can be employed in formulating the aqueous solutions include the acetates, chlorides, formates, nitrates, sulfates, etc. The finished (calcined) catalyst has an apparent bulk density of about 1 gram per cc and a surface area ranging from about 8–50 square meters per gram. In the process of the invention, the calcined catalyst is utilized in the form of particles ranging in size from about 4 to 40 mesh, more preferably from about 8 to 20 mesh. If desired, the powdered catalyst can also be formed into pellets, wafers, etc., ranging in size from about 1/32 to ½ inch or more by utilizing conventional pelleting practices.

As indicated above, aqueous wastes which are applicable as feeds for the process of the present invention are those which contain minor amounts of dissolved and/or suspended organic materials. The process is particularly applicable for feeds in which the organic materials are hydrocarbons and/or oxygenated hydrocarbons such as are obtained in the aqueous streams recovered from the effluent from an oxidative dehydrogenation process. The organic materials can be present in the predominantly aqueous stream in a broad range of concentrations, but will ordinarily be present in amounts less than about 10 weight percent. It is generally more convenient to characterize the aqueous feeds by the total carbon content. Consequently, such feeds can contain from about 10 to about 100,000 ppm carbon, more frequently 25 to about 10,000 ppm carbon, and still more frequently 100–5,000 ppm carbon.

Such aqueous waste streams can be derived from any source such as chemical or biological sources. For best results, the aqueous waste streams will contain relatively little nonvolatile and/or nonoxidizable inorganic materials.

The process of the present invention can be carried out under a wide range of oxidation conditions depending upon the feedstock, catalyst, the desired degree of organic removal, and whether a liquid phase or a vapor phase operation is desired. Reaction can be carried out in any suitable apparatus and can be carried out either batchwise or continuously. Continuous operation through a fixed catalyst bed is presently preferred, such as downflow operation through a vertically positioned fixed catalyst bed. However, other modes of reaction can be used.

In liquid phase operation, the temperature within the reaction zone generally will be about 350° F (177° C) to about 550° F (288° C), with a temperature in the range of about 400° F (204° C) to about 525° F (274° C) being preferred, and under a sufficient pressure to maintain a liquid phase within the reaction zone. For purposes of economy, substantially only that pressure to maintain the liquid phase is used, although pressures of up to 2,000 psig can be used. It will be understood, however, that, even in this liquid phase type of operation, there will be substantial vapor phase present in addition to the liquid phase. This is because of the air which is used as the oxidant and because of the gaseous products of oxidation. In the liquid phase mode of operation, the molar ratio of water to air in the reaction zone will be in the range of 10:1 to 200:1, preferably 25:1 to 50:1. The water feed will generally pass through the reaction zone at a rate of 0.1–10, preferably 2–5, LHSV.

In vapor phase operation, the temperatures can be 350° F (177° C) to 1200° F (649° C) with any convenient pressure which will permit operation in the vapor phase. Generally, pressures from atmospheric to about 100 psig will be used. The molar ratio of feed water to air will be 10:1 to 200:1, preferably 80:1 to 1500:1. The feed water rate can be in the range of 0.1 to 50, preferably 20 to 40, LHSV.

It can be seen from the above that in vapor phase operation which utilizes higher temperatures, much higher space rates can be utilized. Nevertheless, because vapor phase operation requires the vaporization of relatively large quantities of water, it is presently preferred to operate under liquid phase conditions.

The catalysts utilized in the process of the present invention are active and relatively long-lived. However, catalysts do become less active with the passage of time, and when this occurs they can be regenerated at process temperatures by shutting off the waste water feed and passing air over the catalyst bed.

EXAMPLE

A catalyst sample comprising 27 weight percent copper, 41 weight percent manganese, less than 4 weight percent of a mixture of metals previously described, and the balance combined oxygen (obtained commercially) corresponding approximately to the empirical formula $CuMn_2O_4$ was screened to obtain 9–16 mesh particles. The screened material was calcined in air for five hours at 1100° F (593° C) to condition it for use in the oxidation process. The surface area of the catalyst was 26.2 square meters per gram and the apparent bulk density was 0.98 g/cc.

The waste water treated with the catalyst was reboiler blowdown water associated with a process involving the catalytic oxidative dehydrogenation of butenes to butadiene. The total oxygen demand (TOD) of the water averaged about 2400–2600 ppm which represents the equivalent of about 760–840 ppm carbon.

The catalyst (25 cc) was charged to a tubular fixed reactor vertically positioned. A mixture of air and waste water was continuously passed through the reactor while maintaining liquid phase conditions. Deliberate regeneration of the catalyst was not practiced during the test. Process conditions and the results obtained are presented in the following table.

TABLE I

| Liquid Phase Catalytic Air-Oxidation of Aqueous Wastes over Copper/Manganese/Oxygen Catalyst | | | | |
|---|---|---|---|---|
| Sample No. | 1 | 2 | 3 | 4 |
| Temperature, ° F | 482 | 482 | 488 | 488 |
| Temperature, ° C | 250 | 250 | 253 | 253 |
| Pressure, psig | 680 | 695 | 690 | 675 |
| Water/air, mole ratio | 35.0 | 31.3 | 29.5 | 29.4 |
| Water Feed Rate, LHSV[1] | 4.75 | 4.84 | 4.80 | 4.36 |
| Hours on Stream | 92 | 828 | 1744 | 2161 |
| Product Quality | | | | |
| ppm carbon | 25 | ND[2] | 26[2] | ND |
| TOD | 43 | 43 | 33 | 65 |
| % Reduction TOD[3] | 98.3 | 98.3 | 98.7 | 97.4 |

[1]Liquid hourly space velocity (volume water/volume catalyst/hour).
[2]Not determined.
[3]Based on 2500 average TOD for untreated water.

The above data were obtained in a life study of the catalyst. Inspection of the results shows the effectiveness of the catalyst over a long period of time. Even at termination of the test, the quality of the water obtained in the process was very good, based on the TOD values, and it compared favorably in quality to product water obtained much earlier in the test, i.e., after 92 hours on stream.

We claim:

1. A process for the purification of aqueous streams containing organic material impurities dissolved and/or suspended therein to aqueous products substantially free of organic material which comprises contacting an aqueous stream containing oxidizable organic pollutant impurities and an oxygencontaining gas with a copper manganite catalyst consisting essentially of copper, manganese, and oxygen having the formula $Cu_3Mn_2O_6$, $Cu_2Mn_2O_5$, $CuMnO_2$, $CuMn_2O_3$, $CuMn_3O_4$, and $CuMn_2O_4$ in which the atomic ratio of copper to manganese varies from about 0.25:1 to about 4:1 under liquid phase oxidation conditions including a temperature in the range of about 350° F (177° C) to about 550° F (288° C), a liquid hourly space velocity (LHSV) of 0.1 to 10, and a molar ratio of water to oxygen in the range of 10:1 to 200:1 to convert said organic materials to innocuous materials so that said aqueous stream which has been substantially freed of said contaminating impurities can be safely discarded or reused.

2. A process according to claim 1 wherein said oxygen-containing gas is air, and said contacting is effected at a temperature in the range of about 400°–525° F (204°–274° C) in the presence of $CuMn_2O_4$ catalyst and at a liquid hourly space velocity in the range of 2 to 5.

3. A process according to claim 1 wherein said aqueous stream contains hydrocarbons and oxygen-containing hydrocarbon compounds and is obtained from the effluent from an oxidative dehydrogenation process.

4. A process for the purification of aqueous streams containing organic material impurities dissolved and/or suspended therein to aqueous products substantially free of organic material which comprises contacting an aqueous stream containing oxidizable organic pollutant impurities and an oxygen-containing gas with a copper manganite catalyst consisting essentially of copper, manganese, and oxygen having the formula $Cu_3Mn_2O_6$, $Cu_2Mn_2O_5$, $CuMnO_2$, $CuMn_2O_3$, $CuMn_3O_4$, and $CuMn_2O_4$ in which the atomic ratio of copper to manganese varies from about 0.25:1 to about 4:1 under vapor phase oxidation conditions including a temperature in the range of about 350° F (177° C) to about 1200° F (649° C), a liquid hourly space velocity (LHSV) of 0.1 to 50, and a molar ratio of water to oxygen in the range of 10:1 to 200:1 to convert said organic materials to innocuous materials so that said aqueous stream which has been substantially freed of said contaminating impurities can be safely discarded or reused.

5. A process according to claim 4 wherein said catalyst is $CuMn_2O_4$, said oxygen-containing gas is air, and said contacting is effected at a feed water rate of 20 to 40 liquid hourly space velocity (LHSV), and a molar ratio of water to oxygen in the range of 80:1 to 150:1.

6. A process according to claim 4 wherein said aqueous stream contains hydrocarbons and oxygen-containing hydrocarbon compounds and is obtained from the effluent from an oxidative dehydrogenation process.

* * * * *